(12) United States Patent
Wei et al.

(10) Patent No.: US 12,712,680 B2
(45) Date of Patent: Aug. 18, 2026

(54) METHOD, SYSTEM, AND TERMINAL DEVICE FOR DATA TRANSMISSION BASED ON Wi-Fi 6

(71) Applicant: MICRONET UNION TECHNOLOGY (CHENGDU) CO., LTD., Chengdu (CN)

(72) Inventors: Caixia Wei, Chengdu (CN); Tao Chen, Chengdu (CN); Zhiwei Kang, Chengdu (CN)

(73) Assignee: MICRONET UNION TECHNOLOGY (CHENGDU) CO., LTD., Chengdu (CN)

( * ) Notice: Subject to any disclaimer, the term of this patent is extended or adjusted under 35 U.S.C. 154(b) by 226 days.

(21) Appl. No.: 18/336,029

(22) Filed: Jun. 16, 2023

(65) Prior Publication Data

US 2023/0327823 A1 Oct. 12, 2023

Related U.S. Application Data

(63) Continuation of application No. PCT/CN2021/131999, filed on Nov. 22, 2021.

(30) Foreign Application Priority Data

Dec. 18, 2020 (CN) ......................... 202011511436.9

(51) Int. Cl.
*H04W 84/12* (2009.01)
*H04L 1/1867* (2023.01)
(Continued)

(52) U.S. Cl.
CPC ........... *H04L 1/1887* (2013.01); *H04W 28/04* (2013.01); *H04W 84/12* (2013.01)

(58) Field of Classification Search
CPC ......... H04L 1/1887; H04L 1/18; H04L 1/187; H04L 1/188; H04W 84/12; H04W 28/04; H04W 28/18; H04W 72/04; H04W 72/52
(Continued)

(56) References Cited

U.S. PATENT DOCUMENTS 7,133,432 B2 * 11/2006 Kuffner ................. H04W 16/14 370/335
9,755,788 B2 * 9/2017 Pollack ................. H04L 1/1874
(Continued)

FOREIGN PATENT DOCUMENTS

CN 101400139 A 4/2009
CN 102143073 A 8/2011
(Continued)

OTHER PUBLICATIONS

Xiufeng Wang, "Research On Key Technologies for V2V Multi-Hop Broadcast in Vanets", Chinese Doctoral Dissertation Full-text Database Electronic Journal, Degree-Conferring-Institution: Harbin Institute of Technology, pp. 1-133, issue date Feb. 15, 2017.
(Continued)

*Primary Examiner* — John Pezzlo

(57) ABSTRACT

A method, a system, and a terminal device for data transmission based on Wi-Fi 6 are provided. The method includes broadcasting data packets each carrying a device identification of a first device and a sequence number; determining whether a feedback response message is received within a predetermined time period after a current data pocket is transmitted; determining an authority level of the first device when the router does not receive the feedback response message; setting at least one data packet retransmission window when the authority level of the first device is greater than a first predetermined value, and retransmitting the current data pocket within the at least one data packet retransmission window; or when the authority level of the
(Continued)

first device is no more than the first predetermined value, detecting whether feedback information from a second device is received, and transmitting the current data pocket to the first device.

9 Claims, 6 Drawing Sheets

(51) Int. Cl.
*H04W 28/04* (2009.01)
*H04L 1/18* (2023.01)

(58) Field of Classification Search
USPC ................................ 370/252, 329, 430, 278
See application file for complete search history.

(56) References Cited

U.S. PATENT DOCUMENTS 11,991,745 B2 * 5/2024 Kim .................. H04W 74/0808
2007/0239889 A1 * 10/2007 Mochida ............... H04L 69/163 709/237
2011/0149879 A1 * 6/2011 Noriega ............. H04W 72/543 370/329
2011/0276699 A1 * 11/2011 Pedersen ............... H04L 47/781 709/227
2015/0349926 A1 * 12/2015 Pollack ................. H04L 1/1874 714/749
2017/0070317 A1 * 3/2017 Nilsson ................. H04L 1/1893
2017/0279971 A1 * 9/2017 Raleigh ................. H04W 60/06
2019/0319750 A1 * 10/2019 Khosravirad ......... H04L 1/0069
2020/0068627 A1 2/2020 Zhang
2020/0177311 A1 * 6/2020 Ho ........................ H03M 13/05
2023/0016370 A1 * 1/2023 Kim ...................... H04L 5/0053
2024/0146462 A1 * 5/2024 Lin ....................... H04L 5/0055

FOREIGN PATENT DOCUMENTS

CN 102724703 A 10/2012
CN 103220091 A 7/2013
CN 104168284 A 11/2014
CN 107294848 A 10/2017
CN 109644093 A 4/2019
CN 109845368 A 6/2019
CN 110166151 A 8/2019
CN 111050356 A 4/2020
CN 210840064 U 6/2020
CN 111565095 A 8/2020
CN 112492648 A 3/2021
CN 112636877 A 4/2021
EP 3139529 A1 3/2017

OTHER PUBLICATIONS

Marie-Theres Suer et al., “Reliability and Latency Performance of Multi-Connectivity Scheduling Schemes in Multi-User Scenarios”, Published in: 2020 32nd International Teletraffic Congress (ITC 32), Publisher: IEEE, pp. 73-80, Date of Conference: Sep. 24, 2020.

* cited by examiner

| Device A an | ... | Device A a5 | Device A a4 | Device A a3 | Device A a2 | Device A a1 |
|---|---|---|---|---|---|---|

FIG. 3

METHOD, SYSTEM, AND TERMINAL DEVICE FOR DATA TRANSMISSION BASED ON Wi-Fi 6

CROSS-REFERENCE TO RELATED APPLICATIONS

The present disclosure claims priority to Chinese Patent Application No. 202011511436.9 filed on Dec. 18, 2020, with a title of "a method, a system, and a terminal device for data transmission based on Wi-Fi 6", the contents of which are incorporated by reference herein.

FIELD

The present disclosure generally relates to a field of data transmission, and particularly to a method, a system, and a terminal device for data transmission based on Wi-Fi 6.

BACKGROUND

Wi-Fi 6 (formerly known as: 802.11.ax) is the sixth generation of wireless network technology, is a name of a Wi-Fi standard, and is a technology of wireless local area network created by the Wi-Fi Alliance based on the IEEE 802.11 standard. Wi-Fi 6 mainly applies technologies such as OFDMA (Orthogonal Frequency-Division Multiple Access) and MU-MIMO (Multi-User Multiple-Input Multiple-Output). The MU-MIMO technology allows a router to communicate with multiple devices simultaneously instead of sequentially. For example, the MU-MIMO technology allows the router to communicate with four devices simultaneously, and Wi-Fi 6 allows the router to communicate with eight devices.

A data communication method based on Wi-Fi 6 allows the router to communicate with multiple devices, in terms of data transmission, it avoids a problem of queuing for data transmission in the prior art. When the router is communicated with the devices through data links, a speed of data transmission is independent of the plurality of devices and maintained at high speed regardless of whether there is one device or multiple devices.

SUMMARY

In a first aspect, the present disclosure provides a method for data transmission based on Wi-Fi 6. The method includes:

- broadcasting a plurality of data packets each carrying a device identification of a first device and a sequence number of each of the data packets by a router, where the first device is any one of terminal devices communicating with the router;
- determining whether a feedback response message of a current data packet transmitted by the first device is received within a predetermined time period by the router, after the current data packet is transmitted;
- determining an authority level of the first device in response that the router does not receive the feedback response message of the current data packet by the router;
- setting at least one data packet retransmission window in response that the authority level of the first device is greater than a first predetermined value, and retransmitting the current data packet within the at least one data packet retransmission window; or
- in response that the authority level of the first device is no more than the first predetermined value, detecting whether feedback information from a second device is received, in response that the feedback information from the second device is received, transmitting the current data packet to the first device through the second device according to the feedback information.

In some embodiments, when the router is communicated with a plurality of devices, and data packet loss is caused by data link crosstalk, if the authority level of the first device is relatively high, the current data packet is retransmitted by the at least one data packet retransmission window. If the authority level of the first device is relatively low, the current data packet is forwarded through other devices, thereby reducing a risk of packet loss during data transmission between the router and a plurality of devices, while ensuring device communication.

In some embodiments, a step of setting the at least one data packet retransmission window comprises: comparing a length of the current data packet with a length of data capable of being transmitted by the at least one data packet retransmission window; and in response that the length of the current data packet is greater than the length of the data capable of being transmitted by the at least one data packet retransmission window, providing a plurality of data packet retransmission windows and determining a quantity of the plurality of data packet retransmission windows.

In some embodiments, a step of retransmitting the current data packet in the plurality of data packet retransmission windows comprises suspending data transmission between the router and third devices communicated with the router in each of the plurality of data packet retransmission windows, where the third devices are devices other than the first device; and retransmitting the current data packet within the plurality of data packet retransmission windows.

In some embodiments, a step of suspending the data transmission between the router and the third devices communicated with the router in each of the plurality of data packet retransmission windows, comprises determining channel interference degrees between the devices other than the first device and the first device; in response that at least one of the channel interference degrees between a corresponding device of the devices other than the first device and the first device is greater than a second predetermined value, determining the corresponding device as a third device; or determining the devices other than the first device as the third devices, and suspending the data transmission between the router and the third devices.

In some embodiments, a step of retransmitting the current data packet in the plurality of data packet retransmission windows comprises determining a data traffic value between the router and devices other than the first device; in response that the data traffic value is less than a third predetermined value, sequentially and side by side transmitting the current data packet after time T by the plurality of data packet retransmission windows; or in response that the data traffic value is greater than the third predetermined value, setting a window interval $\Delta t$ and sequentially transmitting the current data packet every window interval $\Delta t$ by the plurality of data packet retransmission windows.

In some embodiments, the method further includes: in response that the feedback information from the second device is not received, performing the step of setting the at least one data packet retransmission window.

In some embodiments, a step of transmitting the current data packet to the first device through the second device according to the feedback information comprises transmitting inquiry information to the first device about whether to establish a transmission channel of the current data packet between the first device and the second device, by the router; in response that the router receives authorization information for establishing the transmission channel of the current data packet transmitted by the first device, establishing a temporary transmission channel of the current data packet between the first device and the second device; and transmitting the current data packet to the first device through the temporary transmission channel of the current data packet by the second device.

In some embodiments, the method further includes: in response that the second device fails to forward the current data packet, performing the step of setting the at least one data packet retransmission window to transmit the data packet.

In a second aspect, the present disclosure provides a system for data transmission based on Wi-Fi 6. The system includes: a broadcast module, a first determining module, a second determining module, and a data packet transmitting module. The broadcast module is configured to broadcast a plurality of data packets each carrying a device identification of a first device and a sequence number thereof for a router, The first device is any one of terminal devices communicating with the router.

The first determining module is configured to determine whether a feedback response message of a current data packet transmitted by the first device is received within a predetermined time period, after the current data packet is transmitted.

The second determining module is configured to determine an authority level of the first device in response that the router does not receive the feedback response message of the current data packet.

The data packet transmitting module is configured to set at least one data packet retransmission window in response that the authority level of the first device is greater than a first predetermined value, and retransmit the current data packet within the at least one data packet retransmission window. In response that the authority level of the first device is no more than the first predetermined value, the data packet transmitting module is further configured to detect whether feedback information from a second device is received, and in response that the feedback information from the second device is received, the data packet transmitting module transmits the current data packet to the first device through the second device according to the feedback information.

In a third aspect, the present disclosure provides a terminal device for data transmission based on Wi-Fi 6. The terminal device includes: a processor and a storage device coupled to the processor and storing computer-executable instructions. The processor is configured to execute the computer-executable instructions based on the method for data transmission based on Wi-Fi 6 mentioned above.

BRIEF DESCRIPTION OF THE DRAWINGS

The accompanying drawings, which are incorporated in and constitute a part of this specification, illustrate the embodiments of the present disclosure, and together with the specification to explain the principles of the present disclosure.

For describing the technical solutions of the present disclosure clearly, the following will briefly introduce the accompanying drawings used in the present disclosure. Obviously, for those of ordinary skill in the art, on the premise of not paying creative efforts, additional drawings can be derived from these drawings.

FIG. 3 is a schematic diagram showing a data packet marking mode according to one embodiment of the present disclosure.

DETAILED DESCRIPTION

In order to make the purpose, technical solutions, and advantages of the embodiments of the present disclosure clear, the technical solutions in the embodiments of the present disclosure will be clearly and completely described below, in conjunction with the drawings in the embodiments of the present disclosure. Obviously, the described embodiments are some of the embodiments of the present disclosure, not all of the embodiments. Based on the embodiments in the present disclosure, all other embodiments obtained by those of ordinary skill in the art without making creative efforts fall within the protection scope of the present disclosure.

Figure 1:
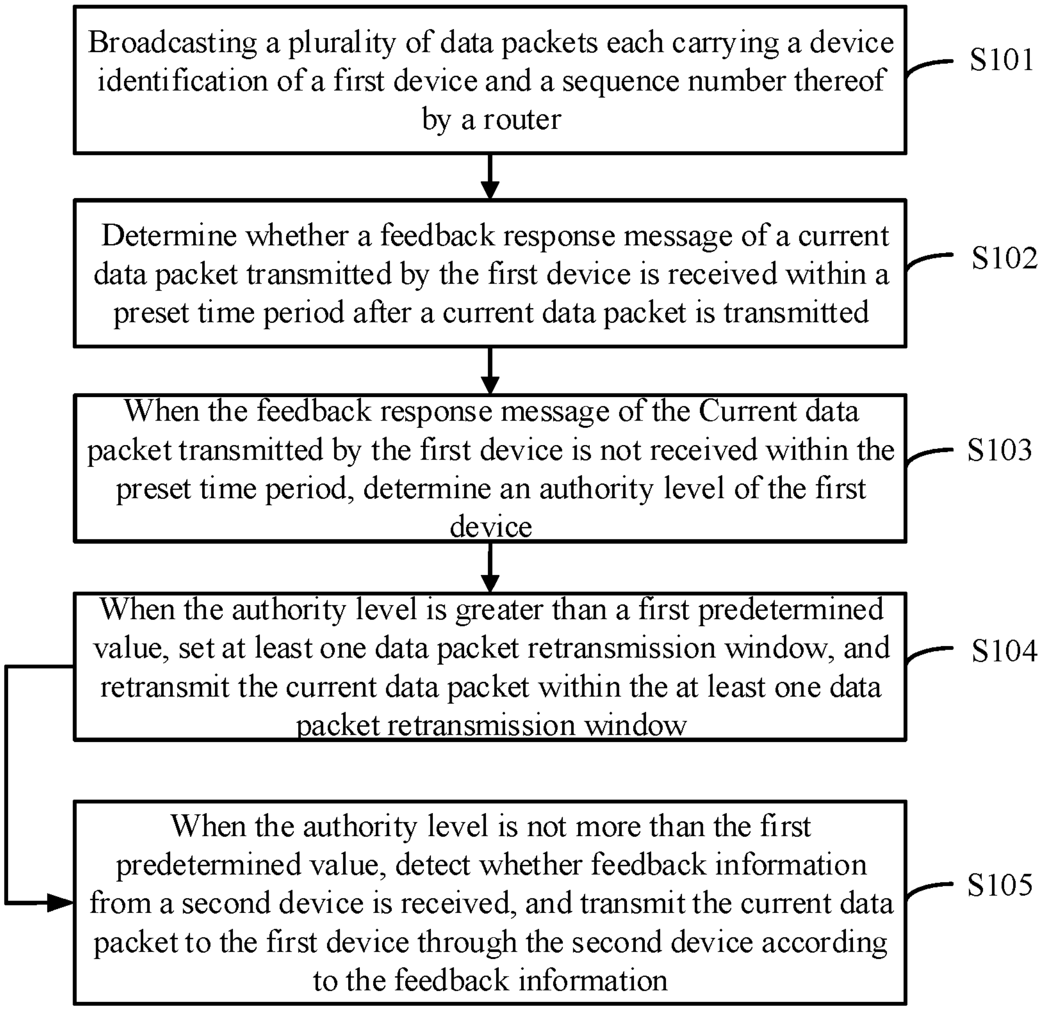
FIG. 1 is a flowchart of a method for data transmission based on Wi-Fi 6 according to one embodiment of the present disclosure.

FIG. 1 is a flowchart of a method for data transmission based on Wi-Fi 6 according to one embodiment of the present disclosure. The method includes following steps.

S101, broadcasting a plurality of data packets each carrying a device identification of a first device and a sequence number thereof by a router;

S102, determining whether a feedback response message of a current data packet transmitted by the first device is received within a predetermined time period by the router after the current data packet is transmitted;

S103, when the feedback response message of the current data packet transmitted by the first device is not received within the predetermined time period after the current data packet is transmitted, determining an authority level of the first device by the router;

S104, when the authority level is greater than a first predetermined value, setting at least one data packet retransmission window, and retransmitting the current data packet within the at least one data packet retransmission window by the router; or S105, when the authority level is no more than the first predetermined value, detecting whether feedback information from a second device is received, and transmitting the current data packet to the first device through the second device according to the feedback information by the router.

Figure 2:
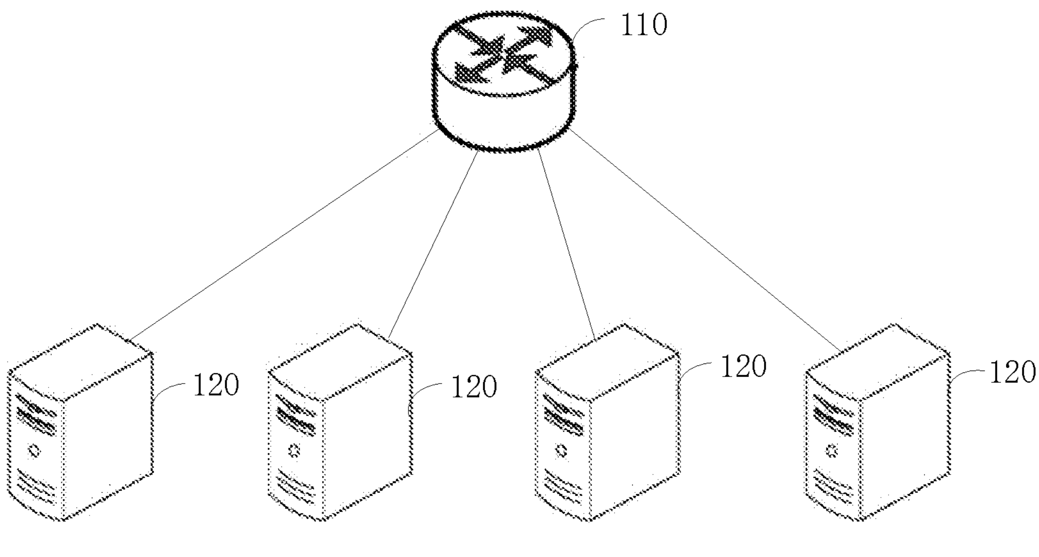
FIG. 2 is a schematic diagram showing communication between a router and a device according to one embodiment of the present disclosure.

In some embodiments, the router 100 performs data communication with a plurality of devices 120, and the first device is any one of the plurality of devices 120, which does not represent a specific device. The devices 120 shown in FIG. 2 are for illustrative purpose only, and the quantity of the plurality of devices 120 is not specifically limited in the embodiment. In actual data transmission, the router based on the method for data transmission based on Wi-Fi 6 is able to transmit data with eight devices at the same time.

The router 110 determines the device identification of each of the devices 120 before communicating with the plurality of devices 120. Each device identification may be a device identification converted from MAC address information of each of the devices 120 or a device identification determined after labeling each of the devices 120 in a communication group, which is not limited in the embodiment.

Figure 3:
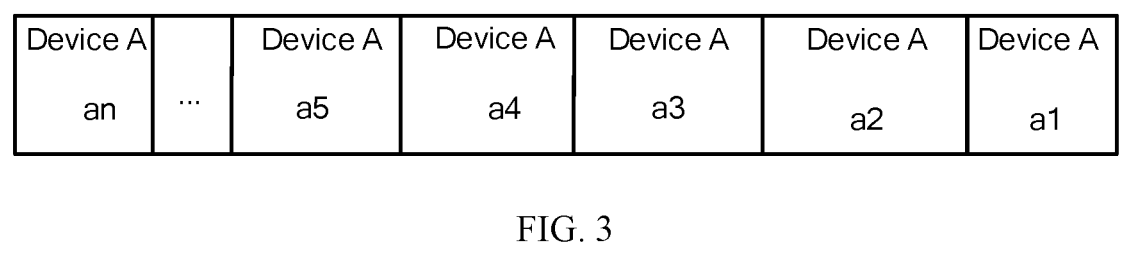

After the router 110 determines the device identification of each of the devices 120, the router 110 marks the plurality of data packets transmitted to the first device with the device identification of the first device when transmitting data in subsequent data communication. When the plurality of data packets are transmitted to the first device, the router 110 further marks each of the data packets with a corresponding sequence number so that the plurality of data packets are sequentially transmitted. Referring to FIG. 3, when the router is ready for data communication with the first device, and the data transmission is not yet in progress, the router marks each of data packets transmitted to the first device with the device identification and the corresponding sequence number.

In some embodiments, in order to ensure that the plurality of data packets transmitted to each of the devices is accurately received, after the router is communicated with the first device and transmits one of the plurality of data packets to the first device, the predetermined time period is set for receiving feedback response message of the one of the plurality of data packets from the first device. The router starts transmitting a next data packet of the plurality of data packets only after receiving the feedback response that the current data packet of the plurality of data packets is received normally.

If the router transmits the plurality of data packets sequentially until the end of the data transmission without receiving the feedback response of the plurality of data packets, the quality of the data transmission cannot be obtained, and whether there is packet loss or not is not determined, thus, the communication quality is not guaranteed.

In some embodiments, if the feedback response message of the current data packets from the first device is not received, it indicates that the current data packet transmitted by the router to the first device is not successfully received. In the embodiment, retransmission of the current data packet is required to be specifically determined according to a priority of the first device, thus, the authority level of the first device is required to be determined.

In some embodiments, a first predetermined value of the authority level is determined. When the authority level of the first device is greater than the first predetermined value, it indicates that among the devices communicated with the router, the authority level of the first device is relatively high. When retransmitting the current data packet, the first device occupies the transmission time of other devices. In one embodiment, the at least one data packet retransmission window is set, the at least one data packet retransmission window represents a short data transmission time. When transmitting data in the at least one data packet retransmission window, the communication of other devices is not affected. Due to the short data transmission time in the at least one data packet retransmission window, the length of the data capable of being transmitted by the at least one data packet retransmission window is also relatively short.

In some embodiments, in order to ensure the transmission of the current data packet, it is necessary to provide a plurality of data packet retransmission windows. For achieving the above purpose, the length of the current data packet and the length of data capable of being transmitted by the at least one data packet retransmission window are compared. When the length of the current data packet is greater than the length of the data capable of being transmitted by the at least one data packet retransmission window, the quantity of the plurality of data packet retransmission windows is determined.

In some embodiments, the length of the current data packet is 1 MB, and the length of the data capable of being transmitted by one data packet retransmission window is 200 kb, thus, five data packet retransmission windows are required. It is also possible that the length of the current data packet is not an integer multiple of the length of the data capable of being transmitted by one data packet retransmission window. For example, the length of the current data packet is 1.1 MB, it is obviously that five data packet retransmission windows are not enough, and six data packet retransmission windows cause a waste of data transmission time. In one embodiment, in order to ensure the retransmission of the current data packet, six data packet retransmission windows are set. However, an end mechanism of the plurality of data packet retransmission windows may also be set to overcome the waste of data transmission time. The above example is only illustrative, in specific cases, the length of the current data packet is random, and the length of the data capable of being transmitted by each data packet retransmission window is determined according to the specific communication situation.

After the quantity of the plurality of data packet retransmission windows is determined, the current data packet is started to be retransmitted. However, it is considered that other devices may have a relatively large impact on the data transmission of the first device, so the data transmission between the router and the third devices communicated with the router is suspended. The third devices are the other devices other than the first device. Thus, the data transmission between the router and the third devices is suspended, and a crosstalk problem is avoid.

In the above embodiment, the devices except the first device is configured as the third devices. However, there is a situation that some devices have little interference with the communication between the first device and the router, thus, there is no need to suspend the communication between these devices and the router. In one embodiment, a second predetermined value for determining a channel interference degree can be set. When a channel interference degree of a corresponding device of the devices to signal transmission between the first device and the router is greater than the second predetermined value, the corresponding device is determined as a third device, and the data transmission between the corresponding device and the router is suspended.

In some embodiments, when it is determined that the data transmission between the third devices and the router is about to end, and the remaining data transmission time is much shorter than the retransmission time of the current data packet, the data transmission between the third devices and the router is suspended until the data transmission of the third devices is completed.

In some embodiments, if the third devices are only parts of the devices that have great interference with the communication between the first device and the router, the router continues to communicate with other devices except the first device and the third devices. At this time, when the retransmission operation of the current data packet is performed through the at least one data packet retransmission window, it is necessary to consider that the retransmission of the current data packet can be realized, and the data communication between the router and other devices that are not suspended should not be affected as much as possible.

Therefore, in one embodiment, a third predetermined value of data traffic is set to determine a current data traffic value between the router and other devices that are not suspended. When the current data traffic value is less than the third predetermined value, the plurality of data packet retransmission windows sequentially and side-by-side transmit the current data packet after time T. In one embodiment, after time T is a time period when the router is communicated with other devices that are not suspended with a smallest data traffic value.

In some embodiments, if the data traffic value is greater than the third predetermined value, it indicates that there is a lot of data communication between other devices that are not suspended and the router, and the plurality of data packet retransmission windows need to transmit the current data pack separately. In some embodiments, a window interval Δt is set between each two adjacent data packet retransmission windows of the plurality of data packet retransmission windows, that is, a time interval between an end of a first data packet retransmission window and a second data packet retransmission window is Δt, and as the greater the data traffic value between the router and other devices that are not suspended, the greater the window interval Δt is set, thereby ensuring the normal communication between other devices that are not suspended and the router.

In some embodiments, a setting mechanism of the window interval Δt is also an intermittent interval of data transmission according to the data communication between the router and other devices that are not suspended. The data traffic value is the smallest in the intermittent interval, thus, a start time and an end time of the intermittent interval of the data transmission are taken as a start time and an end time of the window interval Δt, respectively. Thus, the retransmission of data packets does not affect the communication between other devices that are not suspended and the router.

In some embodiments, if the authority level of the first device is not high enough, adopting the at least one data packet retransmission window may affect the data transmission of the devices with a higher authority level. Therefore, in one embodiment, the router preferentially detects whether feedback information is received from the second device.

Figure 4:
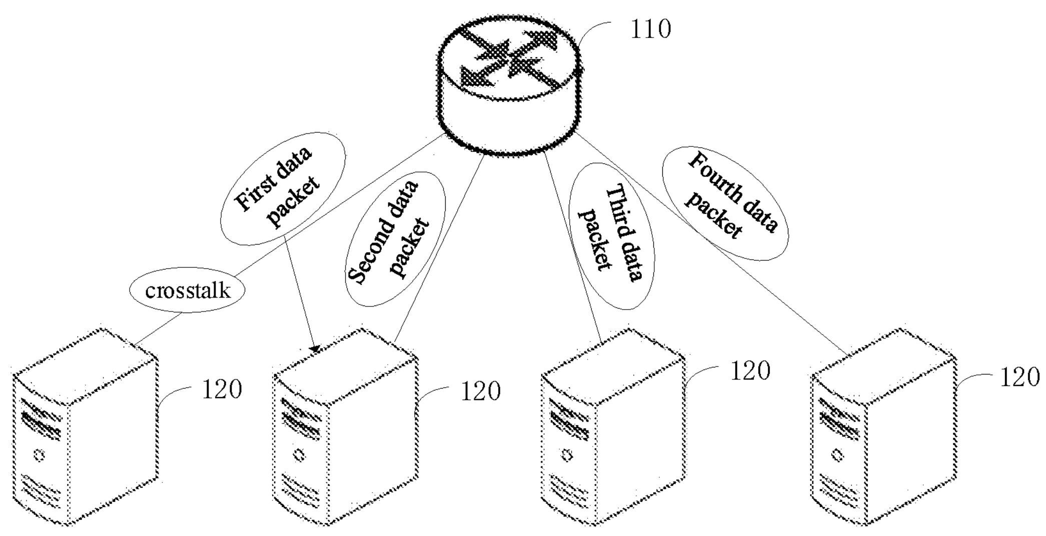
FIG. 4 is a schematic diagram showing crosstalk packet loss during data transmission according to one embodiment of the present disclosure.

Referring to FIG. 4, since the router can communicate and transmit data with the plurality of devices at the same time, when the router transmits the current data packet to the first device through the data link between the router and the first device, from a transmission time of the current data packet and a reception time of the current data packet of the first device, the current data packet may be transmitted to other data links due to the crosstalk between the data links, thereby causing packet loss during data transmission between the router and the first device.

When the second device receives a first data packet of the plurality of data packets (also known as the current data pack) transmitted by the router, the second device determines that the device identification of the first data packet does not match a device identification of the second device, and transmits the feedback information to the router for informing the router that the second device receives the first data packet from the first device. In some embodiments, the second device determines the device identification and the length information of the first data packet, and then packages the first data packet to an information packet and transmits the information packet to the router. After receiving the information packet transmitted by the second device, the router analyzes the information packet to obtain the information (i.e., the device identification and the length information) in the information packet.

When the router receives the information packet from the second device, the data information of the first data packet is temporarily stored in a cache of the second device. The router determines the first device lost the first data packet according to the device identification, transmits an inquiry message to the first device lost the first data packet, and further determines whether to establish a link between the first device and the second device after determining that the first device has lost the first data packet. When the first device determines that received data is incomplete and a first data packet is lost, the first device replies to the router with confirmation information, and accepts that the router establishes a link between the first device and the second device.

At this time, the router transmits information to the second device, to instruct the second device to assist in data transmission, and establishes a temporary link between the first device and the second device. The second device transmits the first data packet to the first device through the temporary link. After the transmission of the first data packet is completed, the temporary link is disconnected, and the communication between the first device and the second device is interrupted. The router not only sets the device identification for each of the data packets of each of the devices, but also marks the sequence number for each of the data packets of each of the devices. Therefore, after the first device receives the plurality of data packets, the first device rearranges the plurality of data packets according to the sequence number of each of the data packets, thereby ensuring the consistency of the received data packets for later use.

In the above embodiments, the router has detected the feedback information from the second device. However, if the authority level of the first device is less than the first predetermined value, and the router does not detect the feedback information from the second device, in order to realize the retransmission of the current data packet, in one embodiment, the current data packet is enforced to be retransmitted by the at least one data packet retransmission window.

In some embodiments, when the router detects the feedback information from the second device, and the first data packet is forwarded through the second device, if the first data packet transmitted by the second device is not received by the first device, the first data packet is also retransmitted by the at least one data packet retransmission window.

The above two situations are equivalent to increasing the authority level of the first device, but there is no real change in the authority level of the first device. Therefore, in this case, when the first data packet is retransmitted by the plurality of data packet retransmission windows, the plurality of data packet retransmission windows transmit the first data packet every window interval Δt. Regardless of whether the data traffic value between the router and other devices that are not suspended with the higher authority level is large or small, the first data packet is transmitted sequentially by using the plurality of data packet retransmission windows side by side only when the data transmission between the router and other devices that are suspended with the higher authority level is in an intermittent state or the suspended state, It can be known from the above embodiments that when the router is communicated with the plurality of devices, and data packet loss is caused by the crosstalk of the data links, if the authority level of the first device is relatively high, the first data packet is retransmitted by the plurality of data packet retransmission windows. If the authority level of the first device is relatively low, the first data packet is forwarded through the second device, thereby reducing the risk of packet loss during data transmission between the router and the plurality of devices, while ensuring device communication.

Figure 5:
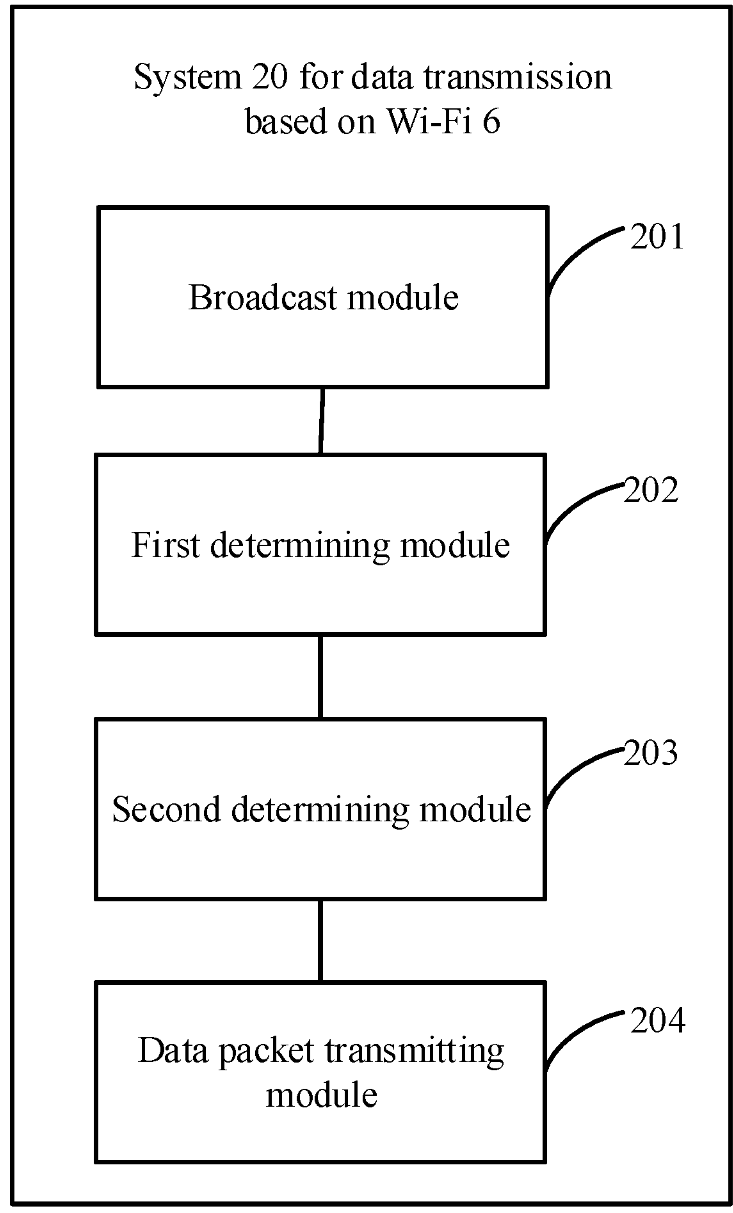
FIG. 5 is a schematic diagram of a system for data transmission based on Wi-Fi 6 according to one embodiment of the present disclosure.

Corresponding to the method for data transmission based on Wi-Fi 6 according to the present disclosure, a system for data transmission based on wifi6 is provided. Referring to FIG. 5, the system 20 for data transmission based on Wi-Fi 6 includes: a broadcast module 201, a first determining module 202, a second determining module 203, and a data packet transmitting module 204. The modules 201-204 also can include functionality represented by hardware or integrated circuits, or by software and hardware combinations, such as a special-purpose processor or a general-purpose processor with special-purpose firmware.

The broadcast module 201 is configured to broadcast the plurality of data packets each carrying the device identification of the first device and the sequence number thereof. The first device is any terminal device communicating with the router.

The first determining module 202 is configured to determine whether the feedback response message of the current data packet transmitted by the first device is received within the predetermined time period for the router after the current data packet is transmitted.

The second determining module 203 is configured to determine the authority level of the first device for the router if the router does not receive the feedback response message of the current data packet.

The data packet transmitting module 204 is configured to set the at least one data packet retransmission window if the authority level of the first device is greater than the first predetermined value, and retransmit the current data packet within the at least one data packet retransmission window. If the authority level of the first device is no more than the first predetermined value, the data packet transmitting module 204 detects whether feedback information from the second device is received, and transmits the current data packet to the first device through the second device according to the feedback information. If the feedback information from the second device is not received, the data packet transmitting module 204 sets the at least one data packet retransmission window.

The data packet transmitting module 204 sets the at least one data packet retransmission window by: comparing the length of the current data packet with the length of data capable of being transmitted by one data packet retransmission window; if the length of the current data packet is greater than the length of data capable of being transmitted by one data packet retransmission window, providing the plurality of data packet retransmission windows and determining the quantity of the plurality of data packet retransmission windows.

The step of retransmitting the current data packet in the at least one data packet retransmission window includes: suspending the data transmission between the router and the third devices communicated with the router in each of the data packet retransmission windows, and retransmitting the current data packet within each of the data packet retransmission windows.

The step of retransmitting the current data packet in the plurality of data packet retransmission windows further includes: determining the data traffic value between the current router and other devices, if the data traffic value is less than a third predetermined value, sequentially transmitting the plurality of data packets after time T by the at least one data packet retransmission window arranged side by side; or, if the data traffic value is greater than the third predetermined value, setting the window interval $\Delta t$ between each two adjacent data packet retransmission windows, and the greater the data traffic value between the router and other devices, the greater the window interval $\Delta t$ is.

In some embodiments, the step of suspending the data transmission between the router and the third devices that communicates with the router includes: determining channel interference degrees between the other devices and the first device, if one of the channel interference degrees between the corresponding device of the other devices and the first device is greater than the second predetermined value, determining the corresponding device as the third device; or determining all the devices other than the first device as the third devices, and suspending the data transmission between the router and all the third devices.

The step of transmitting the current data packet to the first device by the second device includes: transmitting inquiry information to the first device about whether to establish a transmission channel of the current data packet between the first device and the second device, by the router; if the router receives authorization information for establishing the transmission channel of the current data packet transmitted by the first device, establishing a temporary transmission channel of the current data packet between the first device and the second device transmitting the current data packet to the first device through the temporary transmission channel of the current data packet by the second device.

If the second device fails to forward the current data packet, the at least one data packet retransmission window is set to transmit the current data packet.

Figure 6:
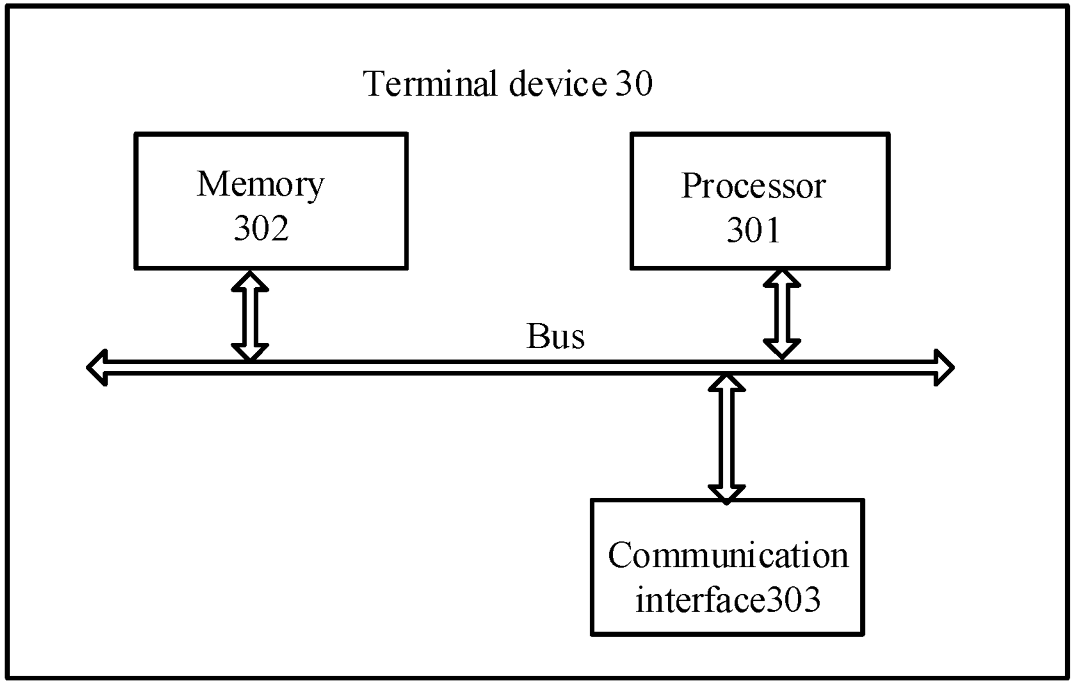
FIG. 6 is a schematic diagram of a terminal device according to one embodiment of the present disclosure.

Referring to FIG. 6, a terminal device for data transmission based on Wi-Fi 6 is further provided. The terminal device 30 includes: a processor 301, a memory 302, and a communication interface 303.

As shown in FIG. 6, the processor 301, the memory 302, and the communication interface 303 are connected with each other through a bus. The bus comprises an address bus, a data bus, a control bus, and the like. For ease of illustration, the bus is shown by only one thick line in FIG. 6, but it does not mean that there is only one bus or one type of bus.

The processor 301 controls overall functions of the terminal device 30, such as starting the terminal device 30, and after the terminal device 30 is started, the router broadcasts the plurality of data packets each carrying the device identification of the first device and the sequence number thereof. The first device is any one of the terminal devices communicating with the router. The router determines whether the feedback response message of the current data packet transmitted by the first device is received within the predetermined time period after the current data packet is transmitted. The router determines the authority level of the first device if the router does not receive the feedback response message of the current data packet. The at least one data packet retransmission window is set if the authority level of the first device is greater than the first predetermined value, and the current data packet is retransmitted within the at least one data packet retransmission window. Alternatively, if the authority level of the first device is no more than the first predetermined value, the router detects whether the feedback information from the second device is received, and transmits the current data packet to the first device through the second device according to the feedback information.

In one embodiment, the processor 301 may be a general processor, for example, a CPU (central processing unit), a NP (network processor), or a combination of the CPU and the NP. The processor may also be a MCU (microprocessor). The processor may also include hardware chips. The hardware chip may be an ASIC (Application Specific Integrated Circuit), a PLD (Programmable Logic Device), or a combination of the ASIC and the PLD. The PLD may be a CPLD (complex programmable logic device), a FPGA (field programmable logic gate array), etc.

The memory 302 is configured to store computer-executable instructions to support the operation of terminal device 30. The memory 302 is implemented by any type of volatile or non-volatile storage device or their combination, such as a SRAM (static random access memory), an EEPROM (electrically erasable programmable read-only memory), an EPROM (erasable Programmable Read Only Memory), a PROM (Programmable Read Only Memory), a ROM (Read Only Memory), a Magnetic Memory, a Flash Memory, a Magnetic Disk, or an Optical Disk.

After the terminal device 30 is started, the processor 301 and the memory 302 are powered on, and the processor 301 reads and executes the computer-executable instructions stored in the memory 302, so as to realize all or part of the steps in the above embodiments of the method for data transmission based on Wi-Fi 6.

The communication interface 303 is configured to transmit data for the terminal device 30, for example, to implement data communication with the router and the devices. The communication interface 303 includes a wired communication interface, and may also include a wireless communication interface. The wired communication interface includes a USB interface, a Micro USB interface, and may also include an Ethernet interface. The wireless communication interface may be a WLAN interface, a cellular network communication interface, or a combination thereof.

In some embodiments, the terminal device 30 provided in the embodiments of the present disclosure further includes a power supply component. The power supply component provides power for various components of the terminal device 30. The power supply component may be a power management system, one or more power supplies, or other components associated with generating, managing, and distributing power to the terminal device 30.

In some embodiments, the terminal device 30 provided in the embodiments of the present disclosure further includes a communication component. The communication component is configured to facilitate wired or wireless communication between the terminal device 30 and other devices. The terminal device 30 can access a wireless network based on communication standards, such as Wi-Fi, 4G or 5G, or a combination thereof. The communication component receives broadcast signals or broadcast related information from an external broadcast management system via a broadcast channel. The communication component further includes a NFC (Near Field Communication) module to facilitate short-range communication. For example, the NFC module is implemented based on a RFID (Radio Frequency Identification) technology, an IrDA (Infrared Data Association) technology, an UWB (Ultra Wide Band) technology, a Bluetooth technology, and other technologies.

The same and similar content among the various embodiments in the present disclosure can be referred to each other. In particular, for the embodiments of the system and the terminal device, the methods therein are basically similar to the embodiments of the method, the description is relatively simple, and the relevant details can be referred to the description in the embodiments of the method.

It should be noted that, relative terms such as "first" and "second" are only used to distinguish one entity or operation from another entity or operation, and do not necessarily require or imply any actual relationship or order exists between entities or operations. Furthermore, the term "includes", "comprises" or any other variation thereof is intended to cover a non-exclusive inclusion such that a process, method, article, or apparatus comprising a set of elements includes not only those elements, but also includes other elements not expressly listed, or also include elements inherent in such a process, method, article, or device. Without further limitations, an element defined by the phrase "includes a . . . " does not exclude the presence of additional identical elements in the process, method, article or apparatus including other same elements.

The above descriptions are only specific implementation manners of the present disclosure, so that those skilled in the art can understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to conform to the widest scope consistent with the principles and novel features disclosed herein.

What is claimed is:

1. A method for data transmission based on Wi-Fi 6, comprising:

broadcasting a plurality of data packets each carrying a device identification of a first device and a sequence number of each of the data packets by a router, wherein the first device is any one of terminal devices communicating with the router;

determining whether a feedback response message of a current data packet transmitted by the first device is received within a predetermined time period by the router, after the current data packet is transmitted;

determining an authority level of the first device in response that the router does not receive the feedback response message of the current data packet by the router;

setting at least one data packet retransmission window in response that the authority level of the first device is greater than a first predetermined value, and retransmitting the current data packet within the at least one data packet retransmission window; or in response that the authority level of the first device is no more than the first predetermined value, detecting whether feedback information from a second device is received, in response that the feedback information from the second device is received, transmitting the current data packet to the first device through the second device according to the feedback information;

wherein a step of setting the at least one data packet retransmission window comprises:

comparing a length of the current data packet with a length of data capable of being transmitted by the at least one data packet retransmission window; and in response that the length of the current data packet is greater than the length of the data capable of being transmitted by the at least one data packet retransmission window, providing a plurality of data packet retransmission windows and determining a quantity of the plurality of data packet retransmission windows.

2. The method according to claim 1, wherein a step of retransmitting the current data packet in the plurality of data packet retransmission windows comprises:

suspending data transmission between the router and third devices communicated with the router in each of the plurality of data packet retransmission windows, wherein the third devices are devices other than the first device; and retransmitting the current data packet within the plurality of data packet retransmission windows.

3. The method according to claim 2, wherein a step of suspending the data transmission between the router and the third devices communicated with the router in each of the plurality of data packet retransmission windows, comprises:

determining channel interference degrees between the devices other than the first device and the first device;

in response that at least one of the channel interference degrees between a corresponding device of the devices other than the first device and the first device is greater than a second predetermined value, determining the corresponding device as a third device; or determining the devices other than the first device as the third devices, and suspending the data transmission between the router and the third devices.

4. The method according to claim 3, wherein a step of retransmitting the current data packet in the plurality of data packet retransmission windows comprises:

determining a data traffic value between the router and devices other than the first device;

in response that the data traffic value is less than a third predetermined value, sequentially and side by side transmitting the current data packet after time T by the plurality of data packet retransmission windows; or in response that the data traffic value is greater than the third predetermined value, setting a window interval $\Delta t$ and sequentially transmitting the current data packet every window interval $\Delta t$ by the plurality of data packet retransmission windows.

5. The method according to claim 4, wherein the method further comprises:

in response that the feedback information from the second device is not received, performing the step of setting the at least one data packet retransmission window.

6. The method according to claim 5, wherein a step of transmitting the current data packet to the first device through the second device according to the feedback information comprises:

transmitting inquiry information to the first device about whether to establish a transmission channel of the current data packet between the first device and the second device, by the router;

in response that the router receives authorization information for establishing the transmission channel of the current data packet transmitted by the first device, establishing a temporary transmission channel of the current data packet between the first device and the second device; and transmitting the current data packet to the first device through the temporary transmission channel of the current data packet by the second device.

7. The method according to claim 6, wherein the method further comprises:

in response that the second device fails to forward the current data packet, performing the step of setting the at least one data packet retransmission window to transmit the data packet.

8. A system for data transmission based on Wi-Fi 6, comprising:

a broadcast module, a first determining module, a second determining module, and a data packet transmitting module, wherein the broadcast module is configured to broadcast a plurality of data packets each carrying a device identification of a first device and a sequence number thereof for a router, the first device is any one of terminal devices communicating with the router;

wherein the first determining module is configured to determine whether a feedback response message of a current data packet transmitted by the first device is received within a predetermined time period, after the current data packet is transmitted;

wherein the second determining module is configured to determine an authority level of the first device in response that the router does not receive the feedback response message of the current data packet;

wherein the data packet transmitting module is configured to set at least one data packet retransmission window in response that the authority level of the first device is greater than a first predetermined value, and retransmit the current data packet within the at least one data packet retransmission window; or in response that the authority level of the first device is no more than the first predetermined value, the data packet transmitting module is further configured to detect whether feedback information from a second device is received, and in response that the feedback information from the second device is received, the data packet transmitting module transmits the current data packet to the first device through the second device according to the feedback information;

wherein when the data packet transmitting module sets the at least one data packet retransmission window, the data packet transmitting module is configured to:

compare a length of the current data packet with a length of data capable of being transmitted by the at least one data packet retransmission window; and in response that the length of the current data packet is greater than the length of the data capable of being transmitted by the at least one data packet retransmission window, providing a plurality of data packet retransmission windows and determining a quantity of the plurality of data packet retransmission windows.

9. A terminal device for data transmission based on Wi-Fi 6, comprising:

a processor; and a storage device coupled to the processor and storing computer-executable instructions;

wherein the processor is configured to execute the computer-executable instructions based on the method for data transmission based on Wi-Fi 6 according to claim 1.

* * * * *